United States Patent
Walrand (10) Patent No.: US 10,967,568 B2
(45) Date of Patent: Apr. 6, 2021

(54) ADDITIVE MANUFACTURING MACHINE COMPRISING A POWDER DISTRIBUTION SYSTEM HAVING A TRAY AND AN INJECTOR

(71) Applicant: AddUp, Cebazat (FR)

(72) Inventor: Gilles Walrand, Cebazat (FR)

(73) Assignee: AddUp, Cebazat (FR)

( * ) Notice: Subject to any disclaimer, the term of this patent is extended or adjusted under 35 U.S.C. 154(b) by 476 days.

(21) Appl. No.: 16/065,700

(22) PCT Filed: Dec. 20, 2016

(86) PCT No.: PCT/EP2016/082039
§ 371 (c)(1),
(2) Date: Jun. 22, 2018

(87) PCT Pub. No.: WO2017/108868
PCT Pub. Date: Jun. 29, 2017

(65) Prior Publication Data
US 2019/0001560 A1    Jan. 3, 2019

(30) Foreign Application Priority Data

Dec. 23, 2015 (FR) ..................................... 1563250

(51) Int. Cl.
*B29C 64/205* (2017.01)
*B33Y 10/00* (2015.01)
(Continued)

(52) U.S. Cl.
CPC .......... *B29C 64/205* (2017.08); *B22F 3/1055* (2013.01); *B23K 26/342* (2015.10);
(Continued)

(58) Field of Classification Search
None
See application file for complete search history.

(56) References Cited

U.S. PATENT DOCUMENTS

| 5,252,264 A | 10/1993 | Forderhase et al. |
| 5,597,589 A | 1/1997 | Deckard |

(Continued)

FOREIGN PATENT DOCUMENTS

| WO | 93/08928 A1 | 5/1993 |
| WO | 2005097476 A2 | 10/2005 |

OTHER PUBLICATIONS

International Search Report dated Mar. 8, 2017, issued in PCT/EP2016/082039.
(Continued)

*Primary Examiner* — Michael P. Rodriguez
(74) *Attorney, Agent, or Firm* — Venable LLP (57) ABSTRACT

A machine is provided for the additive manufacture of a part by complete or partial selective melting of a powder, the machine including: a horizontal working plane; at least one spreading device; at least one system for dispensing powder over the working plane comprising at least one slide for receiving powder and at least one powder injector, the receiving slide being movable in translation, with respect to the working plane, and the injector being positioned above the receiving slide, so as to dispense powder over the receiving slide which is moving between a retracted position and a deployed position.

8 Claims, 6 Drawing Sheets

(51) Int. Cl.
- *B33Y 30/00* (2015.01)
- *B29C 64/153* (2017.01)
- *B29C 64/35* (2017.01)
- *B22F 3/105* (2006.01)
- *B23K 26/342* (2014.01)
- *B33Y 40/00* (2020.01)
- *B29C 64/357* (2017.01)

(52) U.S. Cl.
CPC ............ *B29C 64/153* (2017.08); *B29C 64/35* (2017.08); *B29C 64/357* (2017.08); *B33Y 10/00* (2014.12); *B33Y 30/00* (2014.12); *B33Y 40/00* (2014.12); *B22F 2003/1056* (2013.01); *B22F 2003/1059* (2013.01); *Y02P 10/20* (2015.11); *Y02P 10/25* (2015.11)

(56) References Cited

U.S. PATENT DOCUMENTS

| | | |
|---|---|---|
| 2005/0280185 A1 | 12/2005 | Russell et al. |
| 2010/0042241 A1* | 2/2010 | Inoue ................. A61O 5/77 700/97 |
| 2011/0223349 A1* | 9/2011 | Scott ................. B22F 3/1055 427/532 |
| 2014/0252687 A1 | 9/2014 | El-Dasher et al. |
| 2014/0363585 A1 | 12/2014 | Pialot et al. |
| 2016/0129503 A1 | 5/2016 | El-Dasher et al. |
| 2016/0243652 A1 | 8/2016 | El-Dasher et al. |
| 2018/0229307 A1 | 8/2018 | Pialot et al. |

OTHER PUBLICATIONS

Written Opinion dated Jun. 29, 2017, issued in PCT/EP2016/082039 (in French).
Co-pending U.S. Appl. No. 16/065,692, filed Dec. 20, 2016 (available on USPTO system).

* cited by examiner

ADDITIVE MANUFACTURING MACHINE COMPRISING A POWDER DISTRIBUTION SYSTEM HAVING A TRAY AND AN INJECTOR

BACKGROUND

The invention relates to the field of additive manufacturing machines, also known as 3D printers. More specifically, the invention relates to the injection of powder in such a machine.

According to a known technique, a part is produced by "3D" printing starting from a powder. The part is split up beforehand into slices using a CAO tool. The powder is subsequently spread in successive layers over a work surface, each layer undergoing, before being covered with the following layer, a stage of melting and solidification. To this end, a contribution of energy, for example by a laser beam, makes it possible to form, in the powder layer, a solid corresponding to the slice of the part to be manufactured. The part to be manufactured is generally supported by a plate which moves in a manufacturing chamber as the slices of the part are melted and solidified, in order to be able to form the following powder layer. The plate thus defines a target surface, that is to say a surface, all the points of which can be reached by the laser beam, or any other contribution of energy.

The powder is generally made available on the work surface by following a line, a spreading device, which is typically a roll or a scraper, moving transversely to the powder line and thus providing for the spreading of the powder.

The document U.S. Pat. No. 5,597,589 describes an example of the implementation of the above technique. More specifically, according to this example, a manufacturing machine comprises a powder dispenser, in the case in point made of metal, making it possible to dispense a powder portion. A roll makes it possible optionally to spread the powder. A laser beam will selectively sinter a first layer corresponding to a first slice of the part to be manufactured. The process is subsequently repeated layer after layer.

The powder has to be dispensed over the work surface in front of the spreading device. For example, the powder is in a tank from which the spreading device recovers powder in front of it, on moving, the level of the tank being raised by a piston system as the tank empties, as is presented, for example, in the document WO 93/08928. It is also known to dispense a powder line in front of the spreading device, for example by means of a pouring arm, the length of which corresponds substantially to the length of the spreading device, as in the abovementioned document U.S. Pat. No. 5,597,589.

One problem which is posed is the management of the powder.

This is because, in the field of aeronautics in particular, it is necessary to identify, for each part manufactured, the powder batch which was used in its manufacture. This identification makes it possible, for example, in the event of detection of a defect for a powder batch, to locate the parts manufactured with the defective batch. Consequently, when the powder batch used in the machine is changed, it is necessary to make sure that all the powder of the preceding batch which remains in the machine, both in the supply circuit of the machine and on the surfaces inside the machine exposed to the powder, is removed before installing and using the new batch.

Consequently, there remains a need to facilitate the cleaning of the machine between two powder batches.

In addition, for a part to be manufactured, it is customary to use an amount of powder which is greater than the amount which will, in the end, be melted and solidified in order to constitute the part. In particular, this excess of powder makes it possible to make sure that the powder layer appropriately covers the target surface. More specifically, the powder layers are generally spread starting from a region of the work surface which is fixed, for example starting from the powder tank or starting from a region above which the pouring arm is found. In addition, the dimensions of this region are not adjustable but determined by the length of the spreading device or of the pouring arm. In the end, whatever the dimensions and the geometry of the part to be manufactured, the whole of the manufacturing chamber is filled with the unmelted powder surrounding the part. In addition, it is common practice to provide excess powder overflowing beyond the target surface for each layer, in particular in order to make sure that the whole of the target surface is indeed covered with the powder layer.

Consequently, the amount of powder immobilized in order to manufacture a part is often much greater than the amount of powder which will in the end be melted. This immobilization increases the costs of manufacture of the part.

The document WO 2005/097476 provides for the filling of a trough moving along two rails, and for the filling of the trough over a length between the two rails which is appropriate to the dimensions of the part to be manufactured. However, in this solution, only the parameter relating to the length of powder dispensed between the two rails can be adjusted, limiting the possibilities of management of the powder.

Consequently, there exists in addition a need to improve the management of the powder in order to limit the amount of powder unnecessary for the manufacture of the part in itself.

SUMMARY

To this end, a first subject-matter of the invention is the provision of an additive manufacturing machine with a simplified powder supply circuit, which facilitates the cleaning.

A second subject-matter of the invention is the provision of an additive manufacturing machine which facilitates the identification of the batches of powder which is used.

A third subject-matter of the invention is the provision of an additive manufacturing machine which makes it possible to meter the amount of powder dispensed with increased accuracy.

A fourth subject-matter of the invention is the provision of an additive manufacturing machine which makes it possible to reduce the manufacturing time.

A fifth subject-matter of the invention is the provision of an additive manufacturing machine which decreases the time for cleaning the machine.

A sixth subject-matter of the invention is the provision of an additive manufacturing machine which decreases the amount of powder contaminated by dross and which thus decreases the cost of recycling the said powder.

According to a first aspect, the invention provides a machine for the additive manufacture of a part by complete or partial selective melting of a powder, comprising:
  a horizontal working plane intended to receive a powder layer;

at least one device for spreading the said powder layer over the working plane, which is movable with respect to the working plane along a trajectory over the working plane comprising at least one component parallel to a longitudinal horizontal direction;

at least one system for deposition of powder on the working plane comprising at least one slide for receiving powder and at least one powder injector;

the receiving slide being movable in translation, with respect to the working plane, along at least one transverse horizontal direction, between a retracted position in which the receiving slide extends outside the trajectory of the device for spreading over the working plane and a deployed position in which the receiving slide extends at least in part into the trajectory of the device for spreading over the working plane.

The injector is then positioned above the receiving slide, so as to dispense powder over the receiving slide which is moving between a retracted position and a deployed position.

The machine can in addition exhibit the following characteristics, considered alone or in combination:

the deposition system is removable on the machine, in order to be able to be withdrawn from the machine in particular in order to be cleaned and to ensure the optimum monitoring of the powder batches;

the machine comprises at least two systems for deposition of powder, making it possible to optimize the movements of the spreading device, in order to reduce the manufacturing time, and/or to deposit two materials;

the machine comprises a system for regulating the amount of powder dispensed by the injector at any point of the trajectory of the injector with respect to the receiving slide, making it possible in particular to adjust the amount of powder dispensed as a function of the part to be manufactured and of its position on the working plane;

the receiving slide comprises a receiving surface intended to receive the powder from the injector, the receiving surface being flush with the working plane when the receiving slide is in a deployed position. To this end, for example, the receiving slide is moved with respect to the working plane in a groove extending along the transverse horizontal direction.

According to a second aspect, the invention provides a process for the additive manufacture of a part by complete or partial selective melting of a powder, employing the machine as presented above. The process comprises in particular the following stages:

determining the amount of powder to be dispensed at any point of the trajectory of the injector, with respect to the receiving slide, along the transverse horizontal direction;

moving the receiving slide from a retracted position into a deployed position;

regulating the amount of powder dispensed by the injector at any point of the trajectory of the injector, with respect to the receiving slide;

spreading the powder over the working plane by means of the spreading device.

According to one embodiment, in which the receiving slide is moved with respect to the working plane in the groove extending along the transverse horizontal direction, the process can additionally comprise the following stages:

collecting the excess powder which has not been spread;

receiving the excess powder in the groove.

BRIEF DESCRIPTION OF THE DRAWINGS

Other characteristics and advantages of the invention will become apparent in the light of the description of exemplary embodiments of the invention, accompanied by the figures, in which.

DETAILED DESCRIPTION

Figure 1:
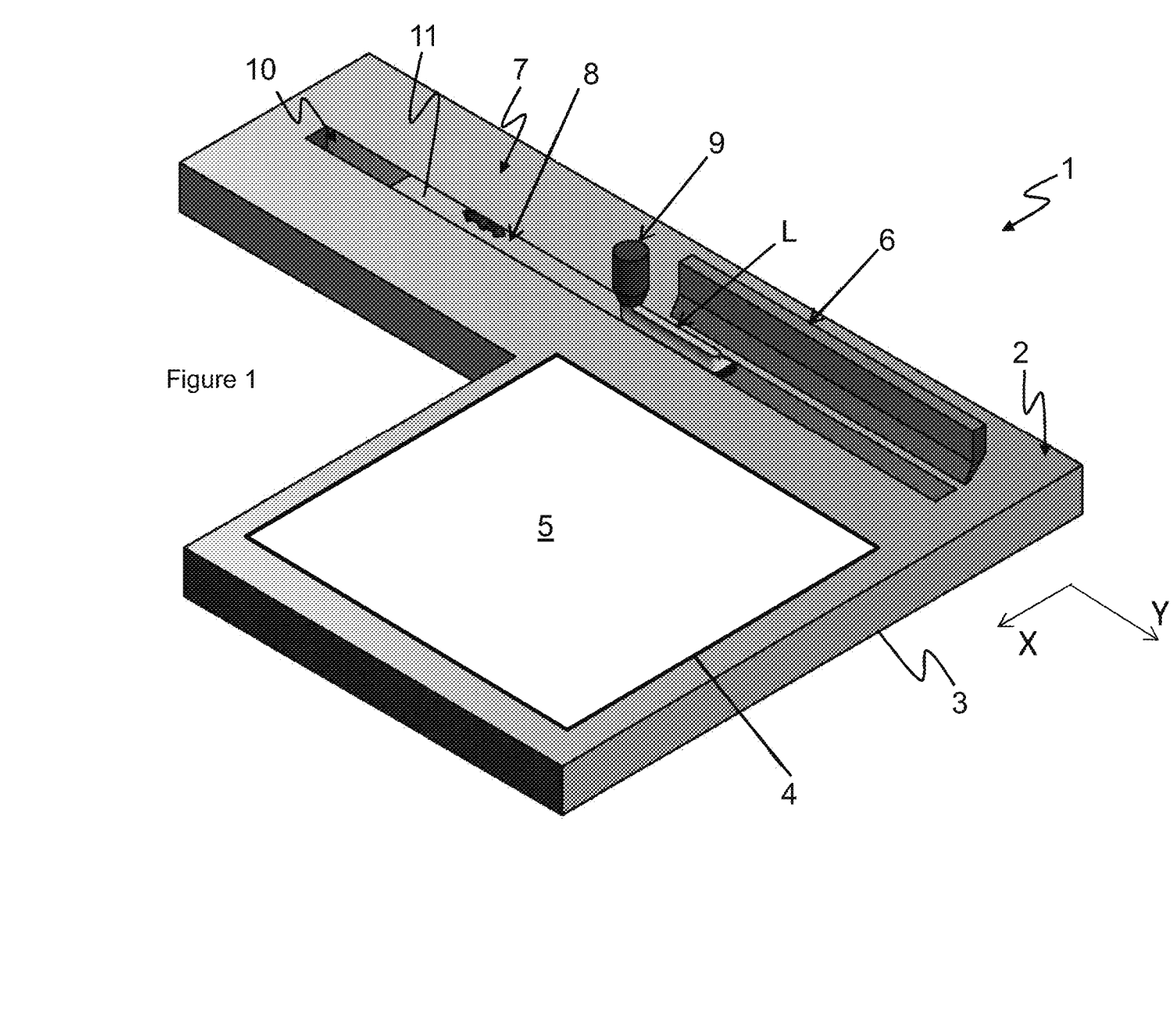
FIG. 1 is a three-dimensional diagrammatic representation of a working plane inside an additive manufacturing machine comprising a powder dispensing system according to an exemplary embodiment.

The interior of a machine 1 for the additive manufacture of a part by complete or partial selective melting, starting from a powdered material, is represented diagrammatically and partially in FIG. 1. The material used can, for example, be metallic or plastic. More specifically, a working plane 2 corresponding to the bottom of a chamber inside the machine 1 is represented in FIG. 1. Preferably, the atmosphere inside the chamber is rendered inert with regard to the material used.

For the purposes of clarity and simplicity, the working plane 2 is regarded here as being horizontal. A longitudinal horizontal axis X and a transverse horizontal axis Y, which are parallel to the working surface 2 and orthogonal to one another, are then defined. The adjective "longitudinal" and its alternative forms then denote, in that which follows, any direction parallel to the longitudinal axis X; likewise, the adjective "transverse" and its alternative forms denote any direction parallel to the transverse axis Y.

More specifically, the working plane 2 is formed on the upper surface of a bottom block 3, constituting the bottom of the chamber of the machine 1.

The machine 1 comprises a casing, not represented in the figures, extending under the working plane 2 along a vertical axis, and opened into the chamber. To this end, the block 3 comprises an opening 4, the casing being placed in coincidence with this opening. The casing is used generally for guidance of a part support plate, not represented either, on which the part in the course of manufacture rests. The plate descends vertically into the casing as the slices of parts are formed by melting and solidification of the powder of the corresponding layers, so that a powder layer of predetermined height on the plate protrudes from the working plane 2 via the opening 4. The opening 4 of the bottom block 3 then delimits a target surface 5, that is to say the surface in which powder is liable to be melted in order to form the part to be manufactured. In other words, the target surface 5 represents all of the points liable to be attacked, for example by a laser beam, in order to melt the powder and to manufacture the part. In general, the upper surface of the part support plate is parallel to the working plane 2. Thus, for the first powder layer, the target surface 5 corresponds to the upper surface of the part support plate.

The machine 1 furthermore comprises a melting system, not represented, which makes it possible for the powder to melt and then to solidify. It is, for example, a laser sending a beam to the target surface 5 in order to melt, at least in part, the powder.

The machine 1 additionally comprises a device 6 for spreading a powder layer, mounted in movable fashion in the chamber with respect to the working plane 2 following at least the longitudinal axis X. In the examples presented here, the spreading device 6 is of scraper type. However, the spreading device 6 can be of any type, for example a roll. The spreading device 6 can be moved longitudinally with a maximum journey between an initial extreme position located on one side of the target surface 5 and a final extreme position located on the other side of the target surface 5. In that which follows, a trajectory of the spreading device 6 on the working plane 2 is defined as being all of the trajectories of all of the points of the spreading device 6 on the working plane 2.

The machine furthermore comprises a system 7 for dispensing powder over the working plane 2. The deposition system 7 comprises a slide 8 for receiving powder and a powder injector 9.

Injector denotes here an injector, the dimensions of the outlet orifice for the powder of which are much less than the dimensions of the working plane 2 and of its target surface 5. The injector 9 can then be described as a point injector.

The slide 8 is movable in translation with respect to the working plane 2 along at least one transverse direction, for example in a groove 10. More specifically, the groove 10 is made in the bottom block 3 and opens onto the working plane 2, between the spreading device 6 in its initial extreme position and the target surface 5. The transverse distance of the groove 10 is sufficient to extend completely into the trajectory of the spreading device 6 in the working plane 2 and beyond at least one side, transversely.

The receiving slide 8 is mounted sliding transversely with respect to the working plane 2, for example in the groove 10, between two positions, when seen in a horizontal plane:
  a retracted position in which the receiving slide 8 extends outside the trajectory of the spreading device 6 on the working plane 2;
  a deployed position in which the receiving slide 8 extends at least in part into the trajectory of the spreading device 6 on the working plane 2.

It is understood that there is not just one deployed position but a multitude, the slide 8 in a deployed position not necessarily extending entirely into the trajectory of the spreading device 6 on the working plane 2.

Likewise, it may not have a single retracted position but a multitude of retracted positions in which the slide 8 is no longer in the trajectory of the spreading device 6.

More specifically still, the receiving slide 8 comprises an upper surface 11 forming the receiving surface for the powder. The receiving surface 11 is flush with the working plane 2, so as to form a continuity with the working plane 2, when the receiving slide 8 is in the deployed position. Thus, when the slide 8 is in the deployed position, the receiving surface 11 is on the trajectory of the spreading device 6, that is to say that the spreading device 6 which is moving longitudinally passes over the receiving surface 11.

The powder injector 9 is positioned above the receiving slide 8, so as to dispense powder over the receiving surface 11 when the slide 8 is moved between the retracted position and a deployed position. More specifically, the injector 9 is fixed with respect to the bottom block 3 and thus with respect to the working plane 2, along at least the transverse direction. The receiving slide 8 is then moved transversely with respect to the working plane 2 and thus with respect to the injector 9, the latter dispensing a line L of powder over the upper surface 11 of the slide 8.

Thus, when the receiving slide 8 is in a deployed position, the injector 9 having dispensed powder over its receiving surface 11, the longitudinal movement of the spreading device 6 makes it possible to spread powder from the receiving slide 8 over at least a portion of the target surface 5.

According to one embodiment, the injector 9 is completely stationary with respect to the working plane 2, simplifying the design of the dispensing system 7.

In an alternative form, the injector 9 can be movable in translation along the vertical axis Z with respect to the working plane 2, as will be explained later.

The powder dispensing system 7 comprising the receiving slide 8 and the injector 9 proves to be particularly advantageous when it is necessary to change the powder batch. This is because, as the injector 9 is stationary with respect to the working plane 2, it can be connected in a simple and direct manner to a powder tank, for example by means of a simple pipe directly connected, on the one hand, to the tank and, on the other hand, to the injector 9. Thus, the powder dispensing circuit comprises a limited number of parts. The powder dispensing system 7 can be removed from the chamber inside the machine 1 and replaced with a new system devoid of any powder residue. A new pipe, also devoid of any powder residue, is installed in order to connect the new dispensing system 7 to a tank comprising the powder of the new batch.

Figure 2:
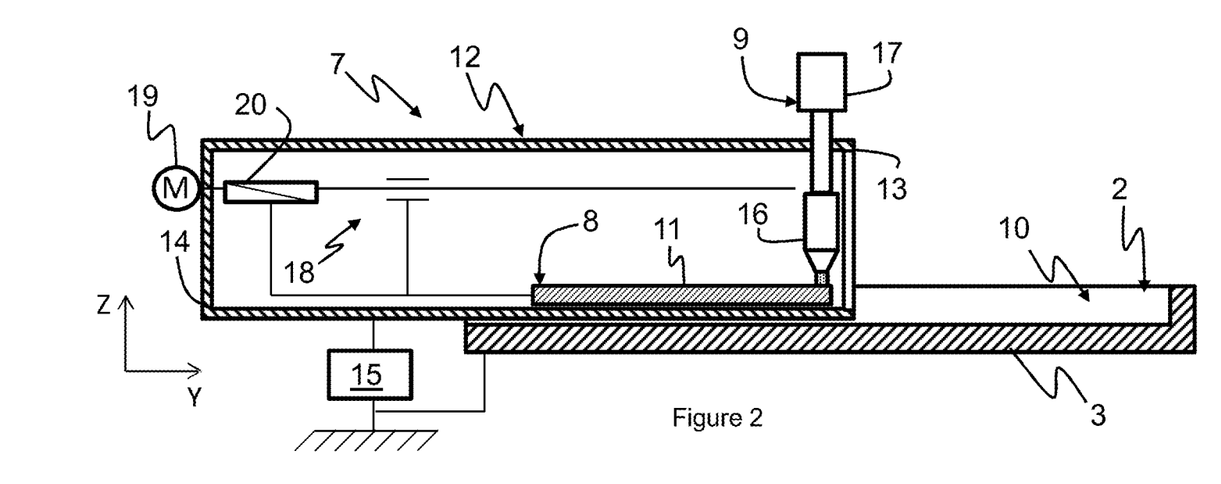
FIGS. 2 to 4 are diagrammatic representations seen in cross section of a powder dispensing system according to another exemplary embodiment, respectively in three different positions.
Figure 3:
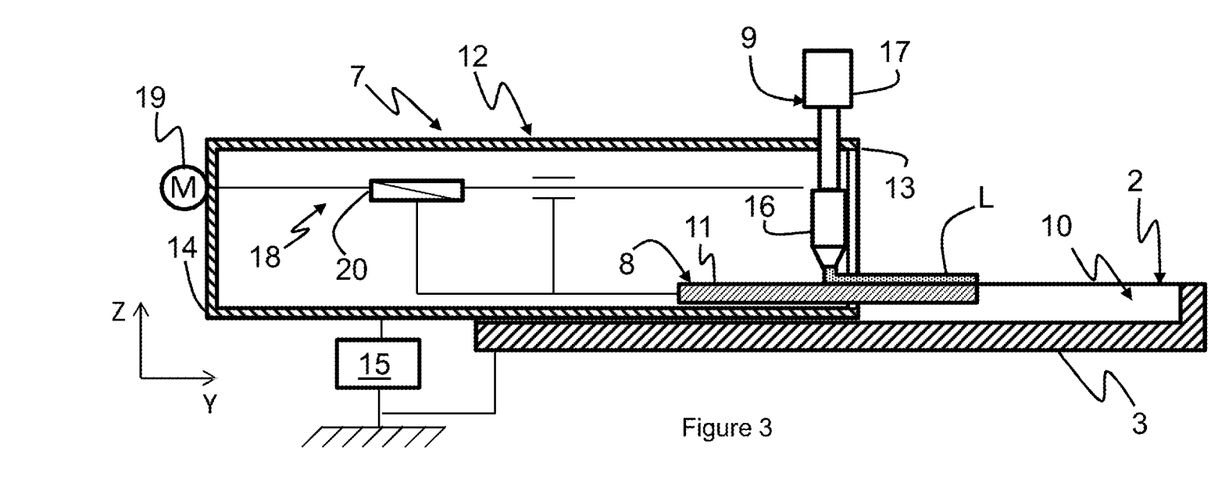
Figure 4:
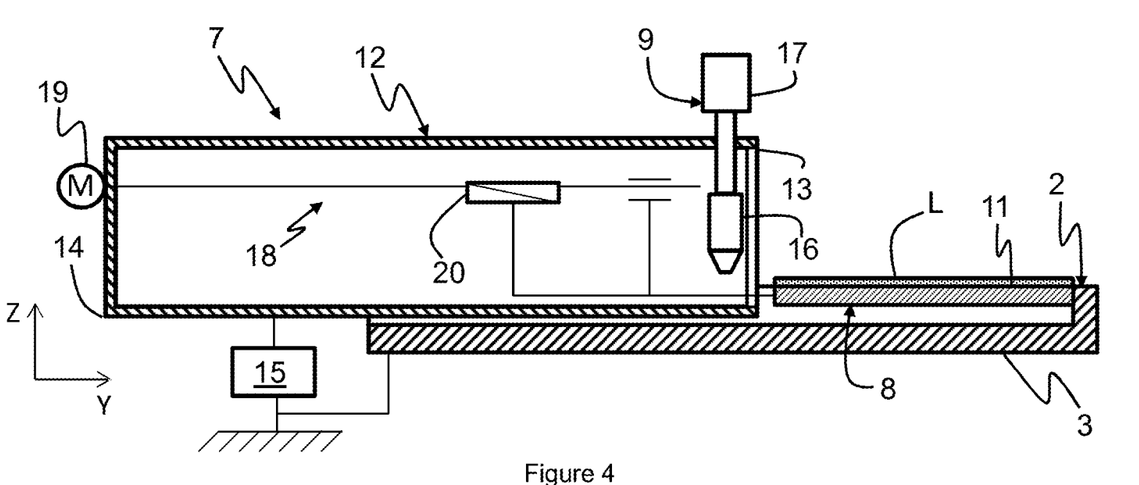

An exemplary embodiment of the dispensing system 7 particularly intended to facilitate the removal thereof and the replacement thereof is illustrated in FIGS. 2 to 4.

According to this example, the dispensing system 7 comprises a sheath 12, fixed in removable fashion to the frame of the machine 1. The sheath 12 is, for example, of cylindrical shape, with a substantially transverse axis, open at a proximal end 13 and closed at a distal end 14, the adjectives "distal" and "proximal" having to be understood here with reference to the spreading device 6. The sheath 12 is thus fixed to the frame by means of a locking system 15, which can be actuated between a locked position rigidly fixing the sheath 12 to the frame of the machine 1 and an unlocked position making possible the removal of the sheath 12 and its installment on the frame of the machine 1. For example, the locking system 15 connects the sheath 12 to the bottom block 3.

The groove 10 extends, according to this example, into the continuity of the sheath 12, starting from the distal end 13.

According to this example, the injector 9 comprises a head 16, the outlet of which is inside the sheath 12, and a connector 17 available outside the sheath 12 in order to be connected to a powder tank, not represented. For example, a link of flexible type can advantageously be assembled, on the one hand, on an outlet of the powder tank and, on the other hand, with the connector 17 of the injector 9 in order to directly link the injector 9 to the tank. Optionally, a metering hopper can be interposed between the tank and the connector 17 of the injector 9.

The receiving slide 8 is mounted in translation along the transverse axis Y on the sheath 12 by means of an actuating system 18. The actuating system 18 comprises, for example, a motor 19 which makes it possible to move the slide 8 in transverse translation by means of an endless screw device 20. Preferably, but not necessarily, the motor 19 should not be in contact with the powder in order to avoid any contamination. For example, the motor 19 is then placed outside the sheath 12 or in a separate compartment inside the sheath 12.

The actuating system 18 then makes it possible to move the slide 8 between a retracted position and a deployed position. Most specifically, according to the exemplary embodiment of FIGS. 2 to 4, when the slide 8 is in a "final" retracted position, it is entirely present inside the sheath 12, for reasons which will be explained later.

There will now be described an exemplary embodiment of the machine comprising the powder dispensing system 7 of FIGS. 2 to 4.

Starting from the final retracted position (FIG. 2), the motor 19 of the actuating system 18 is started up, so as to bring about the controlled transverse movement of the slide 8 from the distal end 14 in the direction of the proximal end 13. In particular, the rate of movement of the slide 8 is controlled. Concomitantly, the injector 9 is opened, so as to dispense powder over the receiving surface 11 of the slide 8.

The slide 8 is thus moved and exits from the sheath 12 by the open proximal end 13 (FIG. 3), the injector 9 depositing a line L of powder on the receiving surface 11. The slide 8 then straddles the inside of the sheath 12 and the groove 10.

The motor 19 continues to bring about the movement of the slide 8 out of the sheath 12, and the slide 8 is then found in a deployed position (FIG. 4), in which it has, for example, entirely exited from the sheath 12. The whole of its receiving surface 11, which may then, but not necessarily, be completely covered with the line L of powder, is thus placed on the trajectory of the spreading device 6.

Once the spreading device 6 has passed over the line L of powder in order to spread it and form the layer at least in part on the target surface 5, the slide 8 is again moved by the actuating system 18 into the final retracted position, in which the slide 8 is entirely comprised inside the sheath 12.

When the powder batch has to be changed, the locking system 15 is placed in the unlocked position, and the connector 17 of the injector 9 is dismounted from the flexible link. The sheath 12 containing the whole of the powder dispensing system 7 can then be withdrawn from the machine 1 in order to be cleaned of the powder residues before being placed back in the machine 1. A new powder batch is then installed in a clean tank, and a clean flexible link is again rendered integral, on the one hand, with the outlet of the tank and, on the other hand, with the connector 17 of the injector 9.

The sheath 12 can be placed on the machine so that the proximal opening 13 opens out, inside the chamber, to the inert atmosphere of the machine and that the remainder of the sheath 12, in particular the connector 17 of the injector, which does not have to be in an inert atmosphere, is outside the chamber. Thus, the sheath 12 is accessible outside the chamber, facilitating the link to the tank, and the removal and the replacement of the dispensing system 7.

According to another embodiment, the receiving slide 8 can, in addition to being movable transversely, be movable vertically with respect to the working plane 2. This alternative form is illustrated in particular in FIGS. 5 and 6, in which the dispensing system 7 has been represented in simplified fashion, the sheath 12 and the actuating system 18 being omitted. According to this other embodiment, the injector 9 is positioned vertically above the receiving surface 11 of the slide 8 so that its powder outlet orifice is at the same height as the working plane 2. In other words, the distance measured vertically between the outlet orifice of the injector 9 and the working plane 2 is virtually zero. The diameter of the outlet orifice of the injector 9 is adjusted in order for the powder which exits therefrom to be dispensed only over the receiving surface 11 and not over the working plane 2 surrounding the groove 10. The slide 8 is, in the retracted position, lowered in the groove 10, close to the bottom of the groove, so that the receiving surface 11 is inside the groove 10. The initial distance between the receiving surface 11 of the slide 8 in the retracted position and the working plane 2 is known and adjusted by vertical movement of the slide 8 in the groove 10. As above, the slide 8 is moved in transverse translation in the groove 10 from a retracted position, in broken lines in FIG. 5, towards a deployed position, in solid lines in FIG. 5, in which the receiving surface 11 is not flush with the working plane 2. As the injector 9 has dispensed powder over the receiving surface 11, the volume of powder dispensed is controlled and known with increased accuracy. This is because the injector 9 is positioned at a height, with respect to the working plane 2, such that the height of the powder line formed on the receiving surface 11 corresponds to the distance, known and controlled, between the receiving surface 11 and the working plane 2. Consequently, as the longitudinal dimension of the groove 10 is known and by controlling the transverse dimension of the line L of powder dispensed by the injector 9 over the receiving surface 11 of the slide, the volume of the line L of powder dispensed by the injector 9 is known. The slide 8 can then be moved vertically, rendering the line L of powder accessible in order to be spread by the spreading device 6. The line L of powder can be rendered completely accessible to the spreading device 6, in which case the slide 8 is moved vertically until the receiving surface 11 is flush with the working plane 2, or partially accessible, with a predetermined volume, by moving the slide 8 vertically by a predetermined height.

Figure 5:
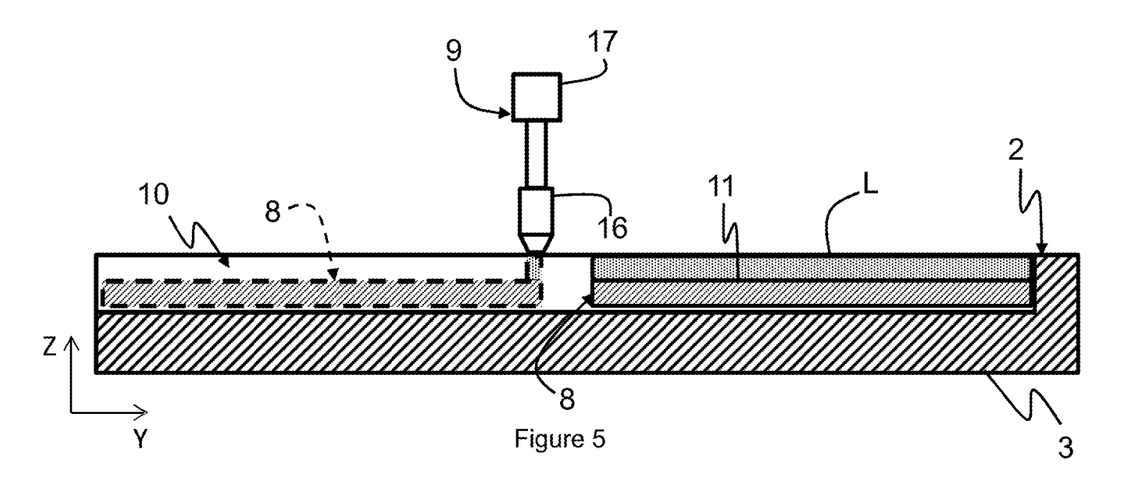
FIGS. 5 and 6 are simplified diagrammatic representations of an alternative form of the powder dispensing system of FIGS. 2 to 4.
Figure 6:
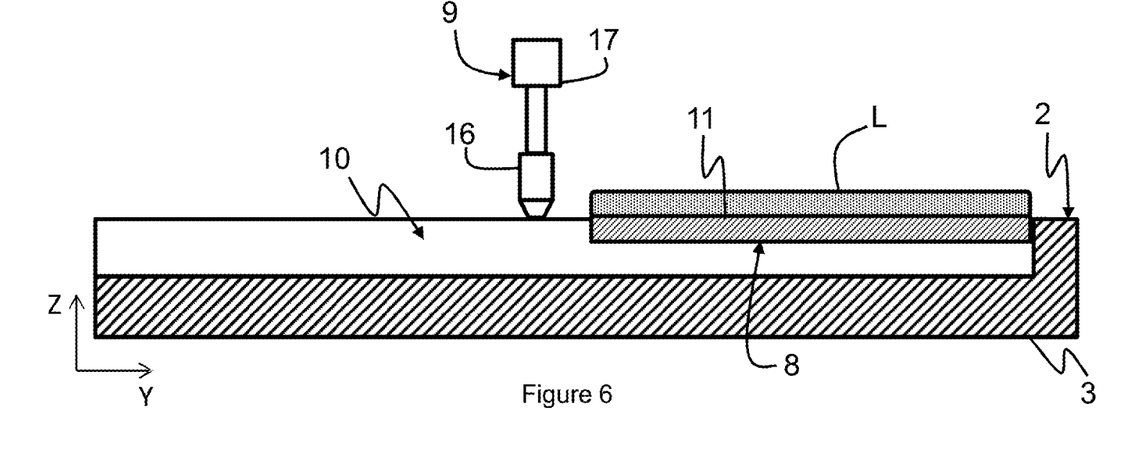

In an alternative form of this other embodiment, the injector 9 can be at a vertical distance from the working plane 2 which is not zero. The slide 8 lowered in the groove then makes it possible to exert control over the spreading of the line L of powder dispensed by the injector 9, the spreading being limited longitudinally by the groove 10, as long as the amount of powder deposited remains less than that which the groove can contain.

The machine 1 can additionally comprise a system for cleaning the slide 8, and more specifically its receiving surface 11, between each line L of powder to be formed, in order to make sure that the amount of powder dispensed by the injector 9 at each line is known with accuracy. For example, the cleaning system can be a suction system in the groove 10, or a scraper-forming blade, positioned, for example, at the proximal end 13 of the sheath 12 of the embodiment presented above. The blade is designed so that it does not act on the line L of powder when the slide 8 is moved from a retracted position towards a deployed position, but only when the slide 8 is moved towards the retracted position, so as to clean the receiving surface 11 of the possible powder residues and dross, that is to say undesirable pieces of agglomerated powder, and to exhibit the clean receiving surface 11 for a new line of powder. The powder residues then fall into the groove 10, and an ancillary device, for example a suction or vibration device, makes it possible to discharge the powder residues outside the groove 10.

The powder dispensing system 7 can additionally make it possible to control and adjust with increased accuracy the amount of powder dispensed over the working plane 2.

To this end, the dispensing system 7 can comprise a device for regulating the amount of powder dispensed by the injector 9 over the slide 8 at any point of the trajectory of the injector 9 with respect to the slide 8, that is to say at any point along a transverse direction of the line L of powder on the receiving surface 11.

The regulating device makes it possible to regulate the amount of powder dispensed over the slide 8, for example by controlling and by adjusting at any instant the rate of movement of the slide 8 and/or the throughput of the injector 9. According to one embodiment, the injector 9 is movable with respect to the working plane 2, and thus with respect to the slide 8, along the vertical direction. More specifically, the vertical distance between the outlet orifice of the injector 9 and the receiving surface 11 of the slide 8 is adjustable. The regulating device then acts on the adjustment of the height of the injector 9. This is because, in this embodiment, the powder falls from the injector 9 substantially by gravity. The powder dispensed over the receiving surface 11 takes the form of a slope connecting the receiving surface 11 and the outlet orifice of the injector 9. When the powder slope blocks the outlet orifice of the injector 9 through which the powder flows, there is no longer flow of powder. Furthermore, when the injector 9 is in contact with the receiving surface 11, the latter blocks the outlet orifice of the injector 9 through which the powder flows; there is no longer flow of powder. It is understood that the dimensions of the outlet orifice of the injector 9 are adjusted in order for the receiving surface 11 and the powder slope to produce this obstruction. Thus, the variation in the height of the injector 9 makes it possible to vary the powder throughput at the outlet of the injector 9.

Thus, on one and the same line L of powder on the slide 8, the amount of powder can be varied.

For example, it may be desirable to dispense a greater amount of powder at the transverse ends of the line L of powder than elsewhere, in order to limit the "tongue" phenomenon. This is because, during the passage of the spreading device, the powder located at the transverse ends on the trajectory of the spreading device 6 has a tendency to be ejected towards the sides, so that the longitudinal edges of the powder layer on the working plane 2 are not rectilinear.

Consequently, by virtue of the powder dispensing system 7, by regulating the amount of powder dispensed by the injector 9 during the movement of the slide 8 from a retracted position towards a deployed position, the amount of powder presented on the trajectory of the spreading device 6 is consequently adjusted.

By virtue of the regulating device, the machine can then, in an alternative form or in combination with the system for cleaning the slide 8, comprise a system for verifying the amount of remaining powder on the receiving surface 11 of the slide 8, after passage of the spreading device 6. For example, the verification system can consist of a sensor of height of remaining powder on the receiving surface 11. The regulating device can thus adjust the amount of powder dispensed over the receiving surface 11 as a function of the remaining amount in order to reach the predetermined amount, this being the case at any point of the trajectory of the injector 9. In an alternative form, the machine can comprise a system for verifying the amount of powder deposited on the receiving surface 11 which makes it possible to control, in a closed loop, the throughput of powder delivered by the injector.

Figures 7, 8:
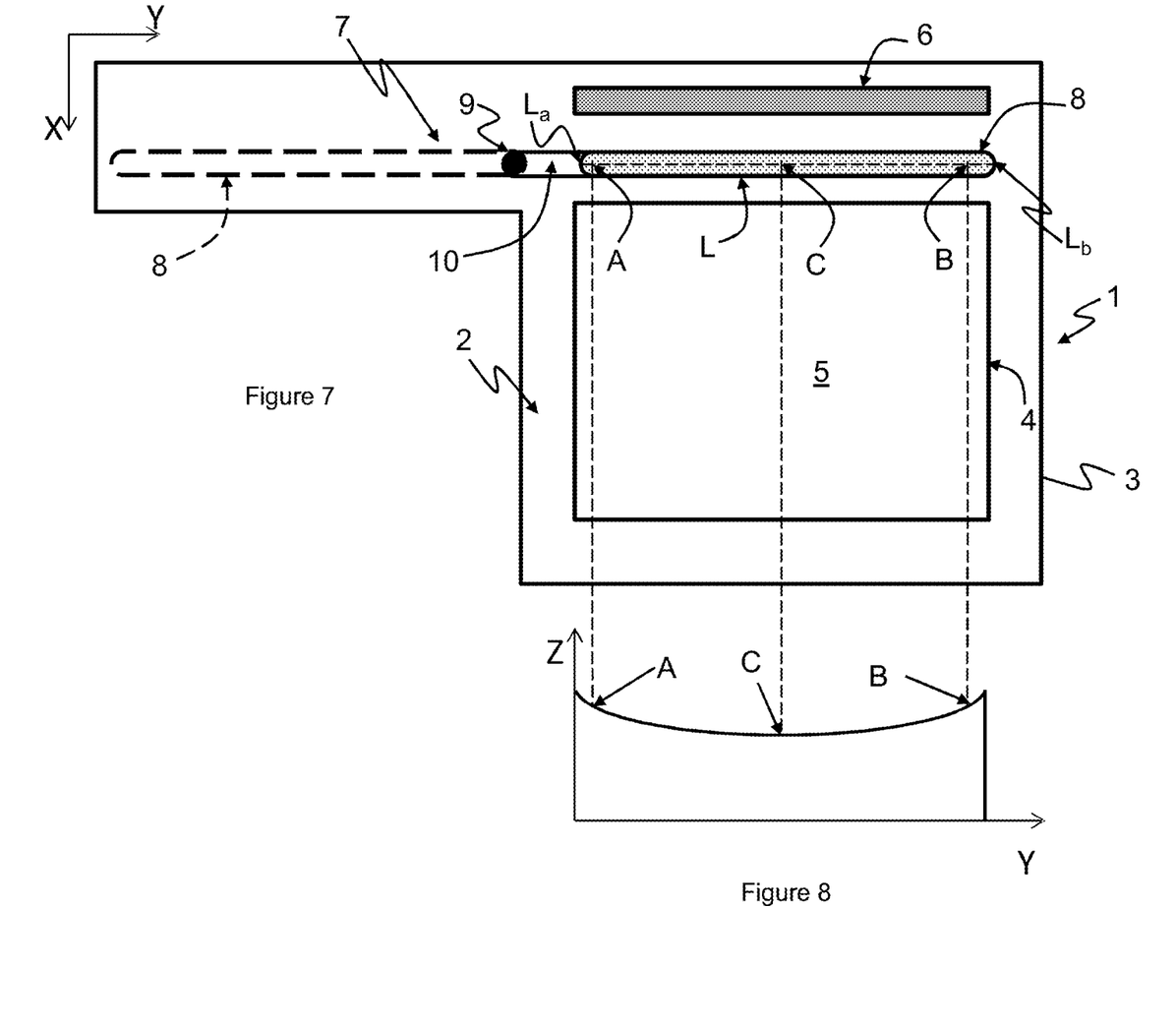
FIG. 7 is a diagrammatic representation in top view of the working plane of FIG. 1 according to a first exemplary embodiment.
FIG. 8 is a graph illustrating the profile of the powder dispensing of FIG. 7.

An exemplary embodiment of the dispensing system 7 of FIG. 1, in particular in order to minimize the tongue effect, has been represented diagrammatically in FIGS. 7 and 8. Thus, a line L of powder has been dispensed over the slide 8, moved from a retracted position, in broken lines in FIG. 7, towards a deployed position, in solid lines in FIG. 7, by translation in the groove 10. A line L of powder is then dispensed over the whole of the receiving surface 11 by the injector 9 as the slide 8 is moved. At the transverse ends $L_a$ and $L_b$ of the line L of powder, the amount of powder dispensed over the slide 8 is greater than elsewhere. For example, the amount of powder is regulated by vertically moving the powder injector 9 along its trajectory with respect to the slide 8. Thus, on considering two points respectively A and B close to the transverse ends respectively $L_a$ and $L_b$ of the line L of powder, and considering a third point C located substantially at the middle of the line L of powder, the three points A, B and C being aligned transversely, the height of powder at the points A and B is greater than at the point C, the profile of the height of powder as a function of the transverse position on the line L of powder then being, for example, parabolic.

The powder dispensing system 7 can, in addition, make it possible to adjust the amount of powder to the shape, to the geometry and/or to the position of the slice T to be melted and solidified of the part to be manufactured on the target surface 5.

Figure 9:
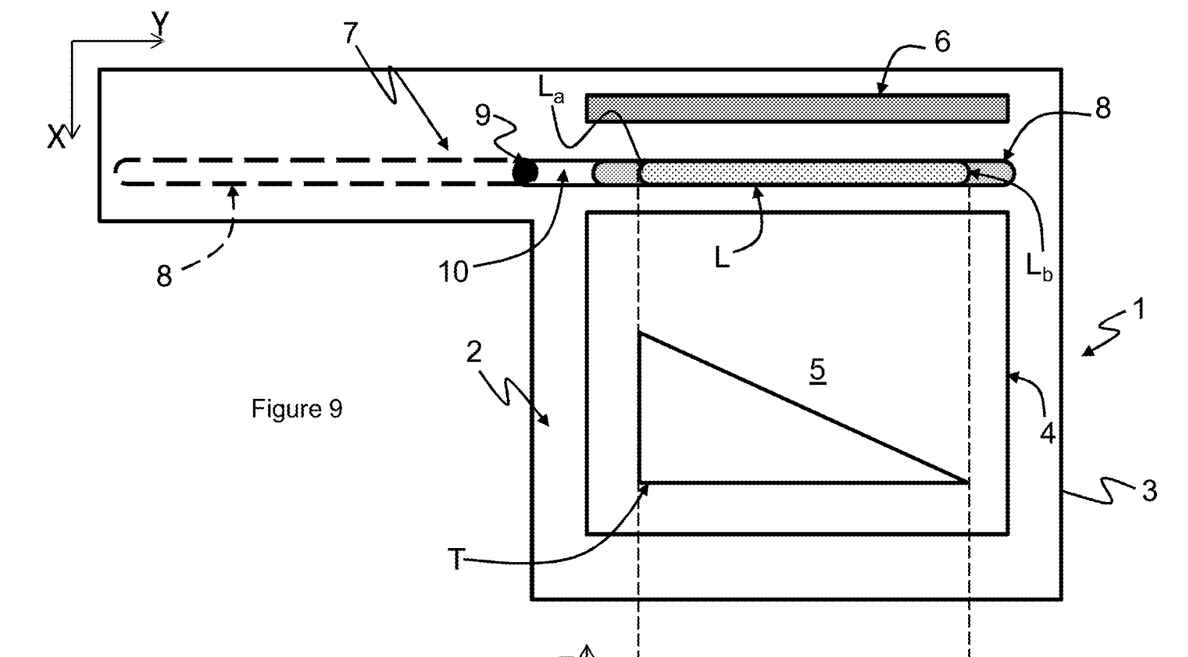
FIG. 9 is a diagrammatic representation in top view of the working plane of FIG. 1 according to a second exemplary embodiment.
Figure 10:
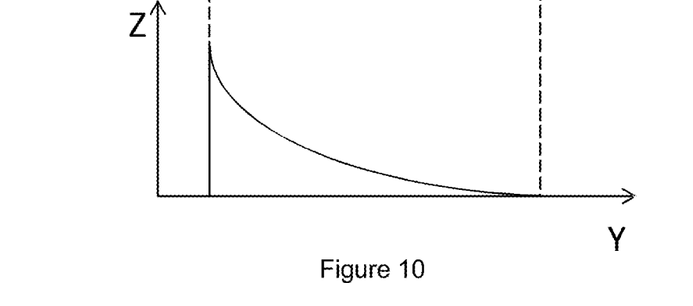
FIG. 10 is a graph illustrating the profile of the powder dispensing of FIG. 9.

An exemplary embodiment of the dispensing system 7 in which the slice T to be melted and solidified has a smaller transverse dimension than the transverse dimension of the target surface 5 and exhibits a transversely inclined edge has been represented diagrammatically in FIGS. 9 and 10. Consequently, it is not necessary for the powder layer to cover the whole of the target surface 5 nor for the same amount of powder to be spread along the transverse direction. Thus, the powder dispensing system 7 is employed in order to regulate the amount of powder dispensed by the injector 9 over the slide 8 so that the line L of powder dispensed does not cover the whole of the receiving surface 11 of the slide 8 but has its transverse dimension adjusted to the transverse dimension of the slice T. In addition, the ends $L_a$ and $L_b$ of the line L of powder are also positioned so as to correspond to the transverse ends of the slice T to be melted and solidified when the slide 8 is in a deployed position. Finally, the powder dispensing system 7 has transversely regulated the amount of powder dispensed by the injector 9 over the slide 8 so as to fit the geometry of the slice T, the amount of powder at the transverse end $L_b$ being less than the amount of powder at the end $L_a$ of the line L of powder. The profile of the height of powder as a function of the transverse position on the line L of powder is then, for example, decreasing from the end $L_a$ towards the end $L_b$.

In an alternative form, the machine 1 can comprise two powder dispensing systems 7, for example positioned on either side of the target surface 5 along the longitudinal direction. Thus, when the spreading device 6, starting from a first initial extreme position, spreads a first powder layer over the target surface 5 up to a final extreme position, it can start again from this final extreme position, as second initial extreme position, in order to spread the following layer of powder. The movements of the spreading device 6 are minimized, since it is no longer necessary to bring it back to one and the same initial extreme position at each new layer.

According to this alternative form, the grooves 10 in the bottom block 3 can be used with a system for discharging the excess powder. This is because, starting from the line L of powder of a first powder dispensing system 7, the spreading device 6 spreads a layer of powder and its longitudinal journey is regulated in order to take it beyond the groove 10 of the second powder dispensing system 7. The excess powder which has not been spread can then be recovered by falling into the groove 10 of the second powder dispensing system 7. The discharging system can be employed in order for the powder which has fallen into the groove 10 to be discharged and optionally recycled in order to be reinjected. The groove 10 of the other powder dispensing system 7 can similarly be connected to a powder discharging system.

The discharging system can, for example, comprise a gathering element positioned under the receiving slide 8, on the opposite side from the receiving surface 11. Thus, when the receiving slide 8 is moved in the corresponding groove 10, the gathering element discharges the powder which has fallen into the groove. For example, the gathering element can be adjusted in order to discharge the powder from the groove when the slide 8 is moved from a deployed position towards a retracted position. This is because the powder thus exits from the same side as that where the slide 8 is found in the retracted position, so that a location on this side for a tank for recovery of the excess powder, or for any element of the discharging system, can easily be provided.

The machine can also comprise two spreading devices 6, each allocated to a powder dispensing system 7 and each spreading a portion of the powder layer over the target surface 5.

Each powder dispensing system 7 can be used with a powder of one and the same material or of a different material.

The invention claimed is:

1. A machine for the additive manufacture of a part by complete or partial selective melting of a powder, the machine comprising:
    a horizontal working plane configured to receive a powder layer;
    at least one spreading device for spreading the powder layer over the working plane, which device is movable with respect to the working plane along a trajectory over the working plane, the trajectory comprising at least one component parallel to a longitudinal horizontal direction;
    at least one deposition system for deposition of powder on the working plane, the deposition system comprising (a) at least one slide for receiving powder and (b) at least one powder injector,
    wherein the receiving slide is movable in translation, with respect to the working plane, along at least one transverse horizontal direction, between (a) a retracted position in which the receiving slide extends outside the trajectory of the spreading device over the working plane and (b) a deployed position in which the receiving slide extends at least in part into the trajectory of the spreading device over the working plane, and
    wherein the injector is positioned above the receiving slide so as to dispense powder over the receiving slide which is moving between the retracted position and the deployed position.

2. A machine according to claim 1, wherein the deposition system is removable with respect to the machine.

3. A machine according to claim 1, wherein the at least one deposition system comprises a plurality of deposition systems.

4. A machine according to claim 1, further comprising a system for regulating an amount of powder dispensed by the injector at any point of the trajectory of the injector, with respect to the receiving slide.

5. A machine according to claim 1, wherein the receiving slide comprises a receiving surface configured to receive the powder from the injector, the receiving surface being flush with the working plane when the receiving slide is in a deployed position.

6. A machine according to claim 4, wherein the receiving slide is moved with respect to the working plane in a groove extending along the transverse horizontal direction.

7. A process for the additive manufacture of a part by complete or partial selective melting of a powder, the process employing the machine according to claim 1, the process comprising the following steps:
    determining an amount of powder to be dispensed at any point of the trajectory of the injector, with respect to the receiving slide, along the transverse horizontal direction;
    moving the receiving slide from the retracted position into the deployed position;
    regulating the amount of powder dispensed by the injector at any point of the trajectory of the injector, with respect to the receiving slide; and
    spreading the powder over the working plane using the spreading device.

8. A process for the additive manufacture of a part by complete or partial selective melting of a powder, the process employing the machine according to claim 6, the process comprising the following steps:
    determining an amount of powder to be dispensed at any point of the trajectory of the injector, with respect to the receiving slide, along the transverse horizontal direction;
    moving the receiving slide from the retracted position into the deployed position;
    regulating the amount of powder dispensed by the injector at any point of the trajectory of the injector, with respect to the receiving slide;
    spreading the powder over the working plane using the spreading device;
    collecting excess powder which has not been spread;
    receiving the excess powder in a groove; and
    discharging the excess powder.

* * * * *